United States Patent [19]

Frame

[11] 4,213,877

[45] Jul. 22, 1980

[54] METHOD OF REACTIVATING A CATALYTIC COMPOSITE OF AN ADSORPTIVE CARRIER MATERIAL AND A MERCAPTAN OXIDATION CATALYST

[75] Inventor: Robert R. Frame, Glenview, Ill.

[73] Assignee: UOP Inc., Des Plaines, Ill.

[21] Appl. No.: 973,303

[22] Filed: Dec. 26, 1978

[51] Int. Cl.$^2$ .............................................. B01J 31/40
[52] U.S. Cl. ..................................... 252/412; 252/414
[58] Field of Search ...................... 252/412, 414, 420; 208/206, 207

[56] References Cited

U.S. PATENT DOCUMENTS

| | | | |
|---|---|---|---|
| 2,744,854 | 5/1956 | Urban, Jr. | 208/206 |
| 3,148,156 | 9/1964 | Henry | 252/420 |
| 4,121,997 | 10/1978 | Frame | 208/206 |

*Primary Examiner*—P. E. Konopka
*Attorney, Agent, or Firm*—James R. Hoatson, Jr.; Robert W. Welch; William H. Page, II

[57] ABSTRACT

A method of reactivating a catalytic composite of an adsorptive carrier material and a metal chelate mercaptan oxidation catalyst is disclosed. The deactivated catalytic composite is washed with an aqueous quaternary ammonium compound solution at a temperature of from about 55°–175° C.

14 Claims, No Drawings

METHOD OF REACTIVATING A CATALYTIC COMPOSITE OF AN ADSORPTIVE CARRIER MATERIAL AND A MERCAPTAN OXIDATION CATALYST

Processes for the oxidation and conversion of mercaptans contained in a sour petroleum distillate wherein the distillate is treated in admixture with an oxidizing agent in contact with a metal chelate mercaptan oxidation catalyst at oxidation reaction conditions, have become well-known and widely-practiced in the petroleum refining industry. Said processes are often advantageously effected in a fixed bed treating system wherein the metal chelate mercaptan oxidation catalyst is adsorbed or impregnated on a solid adsorbent support or carrier material disposed as a fixed bed in a treating column. The sour distillate is typically passed in contact with the catalytic composite in admixture with an oxidizing agent and an aqueous caustic solution. The catalytic composite generally requires periodic reactivation, reactivation being effected in situ, for example, by water-washing at an elevated temperature in accordance with the method of U.S. Pat. No. 3,148,156, or water-washing at an elevated temperature followed by a steam treatment in accordance with the method of U.S. Pat. No. 4,009,120, or sequentially washing the catalytic composite with water, dilute acetic acid and alcohol pursuant to the method of U.S. Pat. No. 3,326,816, the washing in some cases being following by reimpregnation to re-establish a desired concentration of the metal chelate component of the catalytic composite. In time, depending on the character of the sour petroleum distillate being treated, the catalytic composite will no longer respond to conventional reactivation methods and must be replaced.

It is an object of this invention to provide an improved method of reactivation, particularly with respect to those deactivated catalysts which are no longer suitably reactivated by the more conventional methods.

In one of its broad aspects, the present invention embodies a method of reactivating a catalytic composite of an adsorptive carrier material and a metal chelate mercaptan oxidation catalyst which comprises washing said composite with an aqueous quaternary ammonium compound solution at a temperature of from about 55°–175° C.

One of the more specific embodiments of this invention concerns a method of reactivating a catalytic composite of an activated charcoal carrier material and a metal phthalocyanine mercaptan oxidation catalyst which comprises washing said composite with an aqueous quaternary ammonium compound solution at a temperature of from about 55°–175° C., said quaternary ammonium compound being represented by the structural formula

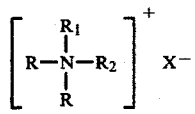

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, citrate, tartrate, and the like.

A still more specific embodiment relates to a method which comprises washing said catalytic composite with an aqueous benzyldimethylalkylammonium hydroxide solution at a temperature of from about 55°–175° C., the alkyl substituent of said benzyldimethylalkylammonium hydroxide being a substantially straight chain alkyl radical containing from about 12 to about 18 carbon atoms.

Other objects and embodiments of this invention will become apparent in the following detailed specification.

The adsorptive carrier material component of the catalytic composite herein contemplated, can be any of the well-known solid adsorbent materials generally utilized as a catalyst support or carrier material. Preferred adsorbent materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated carbon or charcoal. Said adsorbent materials also include the naturally occurring clays and silicates, e.g., diatomaceous earth, Fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for the metal chelate mercaptan oxidation catalyst, especially the metal phthalocyanines, and because of its stability under treating conditions.

The metal chelate mercaptan oxidation catalyst component of the catalytic composite can be any of the various metal chelate mercaptan oxidation catalysts known to the treating art as effective to catalyze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of mercaptan oxidation catalysts.

The metal phthalocyanines employed as a mercaptan oxidation catalyst generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate, or a mixture thereof, being particularly preferred. The sulfonated derivatives may be prepared, e.g., by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The metal chelate mercaptan oxidation catalysts, particularly the metal phthalocyanines, are readily adsorbed or impregnated on the solid adsorbent support or carrier material to produce the catalytic composite herein contemplated. In general, up to about 25 wt.% metal phthalocyanine can be adsorbed or impregnated on the solid adsorbent support and still form a stable catalytic composite. A lesser amount in the range of from about 0.1 to about 10 wt.% will usually be preferred. The metal chelate component is generally composited with the solid adsorbent support utilizing conventional techniques whereby the support, in the form of spheres, pills, pellets, granules or other particles of uniform or irregular size or shape, is soaked, suspended, dipped one or more times, or otherwise immersed in an aqueous or alcoholic impregnating solution and/or dispersion to adsorb a given quantity of the metal chelate component thereon. One preferred method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

In the process of sweetening a sour petroleum distillate, it has heretofore been the practice to oxidize the mercaptans contained therein in the presence of an alkaline reagent. A supported mercaptan oxidation catalyst is typically initially saturated with the alkaline reagent, and the alkaline reagent is thereafter passed in contact with the catalyst bed, continuously or intermittently as required, admixed with the sour petroleum distillate. Any suitable alkaline reagent may be employed. An alkaline metal hydroxide in aqueous solution, e.g., sodium hydroxide in aqueous solution, is most often employed. The solution may further comprise a solubilizer to promote mercaptan solubility, e.g., alcohol, and especially methanol, ethanol, n-propanol, isopropanol, etc., and also phenyls, cresols, nd the like. A particularly preferred alkaline reagent is an aqueous caustic solution comprising from about 2 to about 30 wt.% sodium hydroxide. The solubilizer, when employed, is preferably methanol, and the alkaline solution may suitably comprise from about 2 to about 100 vol.% thereof. Sodium hydroxide and potassium hydroxide constitute the preferred alkaline reagent, others including lithium hydroxide, rubidium hydroxide and cesium hydroxide are also suitably employed.

The treating process is usually effected an ambient temperature conditions, although higher temperatures up to about 105° C. are suitably employed. Pressures of up to about 1000 psi. or more are operable, although atmospheric or substantially atmospheric pressures are entirely suitable. Contact times equivalent to a liquid hourly space velocity of from about 0.5 to about 10 or more are effected to achieve a desired reduction in the mercaptan content of a sour petroleum distillate, and optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates commonly treated in contact with the described catalytic composite vary widely in composition depending on the source of the petroleum from which the distillate was derived, the boiling range of the distillate, and the method of processing the petroleum to produce the distillate, and these differences largely determine the rate of catalyst deactivation as well as the extent to which the catalyst is deactivated. The differences include the character and concentration of the acidic and other non-hydrocarbon impurities, usually phenolic materials, which occur in greater concentration in the higher boiling distillates. These impurities, while not necessarily per se adsorbed on the catalytic composite, are readily adsorbed in the higher oxidation state induced by the oxidation conditions of the treating process. The higher boiling distillates, for example kerosene, jet fuel, and the like, will further generally contain the more difficultly oxidized mercaptans, that is, the caustic insoluble, highly hindered branched chain and aromatic thiols, especially the higher molecular tertiary and polyfunctional mercaptans.

The method of this invention is of particular advantage with respect to the reactivation of the more difficultly reactivated catalysts, such as become deactivated in the treatment of the higher boiling sour petroleum distillates, or which have otherwise become deactivated beyond acceptable reactivation by conventional means.

Pursuant to the present invention, the catalytic composite is reactivated by washing with an aqueous quaternary ammonium compound at a temperature of from about 55°-175° C. The quaternary ammonium compounds herein contemplated include such as tetramethylammonium hydroxide, tetraethylammonium hydroxide, tetrapropylammonium hydroxide, tetrabutylammonium hydroxide, trimethylethylammonium hydroxide, tetrabutylammonium hydroxide, trimethylethylammonium hydroxide, trimethylpropylammonium hydroxide, trimethylbutylammonium hydroxide, dimethyldiethylammonium hydroxide, dimethyldipropylammonium hydroxide, dimethyldibutylammonium hydroxide, methyltriethylammonium hydroxide, methyltripropylammonium hydroxide, methyltributylammonium hydroxide, phenyltrimethylammonium hydroxide, phenyltriethylammonium hydroxide, phenyltripropylammonium hydroxide, phenyltributylammonium hydroxide, benzyltrimethylammonium hydroxide, benzyltriethylammonium hydroxide, benzyltripropylammonium hydroxide, benzyltributylammonium hydroxide, diphenyldimethylammonium hydroxide, diphenyldiethylammonium hydroxide, diphenyldipropylammonium hydroxide, diphenyldibutylammonium hydroxide, dibenzyldimethylammonium hydroxide, dibenzyldiethylammonium hydroxide, dibenzyldipropylammonium hydroxide, dibenzyldibutylammonium hydroxide, triphenylmethylammonium hydroxide, triphenylethylammonium hydroxide, triphenylpropylammonium hydroxide, triphenylbutylammonium hydroxide, and the like.

A preferred class of quaternary ammonium compounds is represented by the structural formula

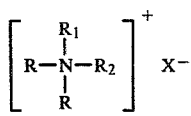

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, acetate, citrate, tartrate, and the like. $R_1$ is preferably an alkyl radical containing from about 12 to about 18 carbon atoms, $R_2$ is preferably benzyl, and X is preferably chloride and/or hydroxide. Preferred quaternary ammonium compounds thus include benzyldimethyldodecylammonium chloride, benzyldimethyltetradecylammonium chloride, benzyldimethylhexadecylammonium chloride, benzyldimethyloctadecylammonium chloride, and the like. Other suitable quaternary ammonium compounds include phenyldimethylpentylammonium chloride, phenyldiethylpentylammonium chloride, phenyldipropylpentylammonium chloride, phenyldimethylhexylammonium chloride, phenyldiethylhexylammonium chloride, phenyldipropylhexylammonium chloride, phenyldimethyloctylammonium chloride, phenyldiethyloctylammonium chloride, phenyldipropyloctylammonium chloride, phenyldimethyldecylammonium chloride, phenyldiethyldecylammonium chloride, phenyldipropyldecylammonium chloride, phenyldimethyldodecylammonium chloride, phenyldiethyldodecylammonium chloride, phenyldipropyldodecylammonium chloride, phenyldimethyltetradecylammonium chloride, phenyldiethyltetradecylammonium chloride, phenyldipropyltetradecylammonium chloride, phenyldimethylhexadecylammonium chloride, phenyldiethylhexadecylammonium chloride, phenyldipropylhexadecylammonium chloride, phenyldimethyloctadecylammonium chloride, phenyldiethyloctadecylammonium chloride, phenyldipropyloctadecylammonium chloride, phenyldimethyleicosylammonium chloride, phenyldiethyleicosylammonium chloride, phenyldipropyleicosylammonium chloride, naphthyldimethylpentylammonium chloride, naphthyldiethylpentylammonium chloride, naphthyldipropylpentylammonium chloride, naphthyldimethylhexylammonium chloride, naphthyldiethylhexylammonium chloride, naphthyldipropylhexylammonium chloride, naphthyldimethyloctylammonium chloride, naphthyldiethyloctylammonium chloride, naphthyldipropyloctylammonium chloride, naphthyldimethyldecylammonium chloride, naphthyldiethyldecylammonium chloride, naphthyldipropyldecylammonium chloride, naphthyldimethyldodecylammonium chloride, naphthyldiethyldodecylammonium chloride, naphthyldipropyldodecylammonium chloride, naphthyldimethyltetradecylammonium chloride, naphthyldiethyltetradecylammonium chloride, naphthyldipropyltetradecylammonium chloride, naphthyldimethylhexadecylammonium chloride, naphthyldiethylhexadecylammonium chloride, naphthyldipropylhexadecylammonium chloride, naphthyldimethyloctadecylammonium chloride, naphthyldiethyloctadecylammonium chloride, naphthyldipropyloctadecylammonium chloride, benzyldimethylpentylammonium chloride, benzyldiethylpentylammonium chloride, benzyldipropylpentylammonium chloride, benzyldimethylhexylammonium chloride, benzyldiethylhexylammonium chloride, benzyldipropylhexylammonium chloride, benzyldimethyloctylammonium chloride, benzyldiethyloctylammonium chloride, benzyldipropyloctylammonium chloride, benzyldimethyldecylammonium chloride, benzyldiethyldecylammonium chloride, benzyldipropyldecylammonium chloride, benzyldiethyldodecylammonium chloride, benzyldipropyldodecylammonium chloride, benzyldiethyltetradecylammonium chloride, benzyldipropyltetradecylammonium chloride, benzyldiethylhexadecylammonium chloride, benzyldipropylhexadecylammonium chloride, benzyldiethyloctadecylammonium chloride, benzyldipropyloctadecylammonium chloride, benzyldimethyleicosylammonium chloride, benzyldiethyleicosylammonium chloride, benzyldipropyleicosylammonium chloride, tolyldimethylpentylammonium chloride, tolyldiethylpentylammonium chloride, tolyldipropylpentylammonium chloride, tolyldimethylhexylammonium chloride, tolyldiethylhexylammonium chloride, tolyldipropylhexylammonium chloride, tolyldimethyloctylammonium chloride, tolyldiethyloctylammonium chloride, tolyldipropyloctylammonium chloride, tolyldimethyldecylammonium chloride, tolyldiethyldecylammonium chloride, tolyldipropyldecylammonium chloride, tolyldimethyldodecylammonium chloride, tolyldiethyldodecylammonium chloride, tolyldipropyldodecylammonium chloride, tolyldimethyltetradecylammonium chloride, tolyldiethyltetradecylammonium chloride, tolyldipropyltetradecylammonium chloride, tolyldimethylhexadecylammonium chloride, tolyldiethylhexadecylammonium chloride, tolyldipropylhexadecylammonium chloride, tolyldimethyloctadecylammonium chloride, tolyldiethyloctadecylammonium chloride, tolyldipropyloctadecylammonium chloride, tolyldimethyleicosylammonium chloride, tolyldiethyleicosylammonium chloride, tolyldipropyleicosylammonium chloride, diphenylmethylpentylammonium chloride, diphenylethylpentylammonium chloride, diphenylpropylpentylammonium chloride, diphenylmethylhexylammonium chloride, diphenylethylhexylammonium chloride, diphenylpropylhexylammonium chloride, diphenylmethyloctylammonium chloride, diphenylethyloctylammonium chloride, diphenylpropyloctylammonium chloride, diphenylmethyldecylammonium chloride, diphenylethyldecylammonium chloride, diphenylpropyldecylammonium chloride, diphenylmethyldodecylammonium chloride, diphenylethyldodecylammonium chloride, diphenylpropyldodecylammonium chloride, diphenylmethyltetradecylammonium chloride, diphenylethyltetradecylammonium chloride, diphenylpropyltetradecylammonium chloride, diphenylmethylhexadecylammonium chloride, diphenylethylhexadecylammonium chloride, diphenylpropylhexadecylammonium chloride, diphenylmethyloctadecylammonium chloride, diphenylethyloctadecylammonium chloride, diphenylpropyloctadecylammonium chloride, diphenylmethyleicosylammonium chloride, diphenylethyleicosylammonium chloride, diphenylpropyleicosylammonium chloride, as well as the corresponding fluoride, bromide, iodide, hydroxide, sulfate, nitrate, nitrite, phosphate, acetate, citrate and tartrate compounds. In any case, the selected quaternary ammonium compound is suitably effective in aqueous solution in a concentration of from about 0.01 to about 10 wt.%.

Regeneration of the catalytic composite is preferably, although not necessarily, effected in situ, that is, with the catalytic composite disposed as a fixed bed in the treating column in which it has been used in the sweetening process. Sufficient of the hot aqueous ammonium compound solution can be charged and retained in the treating column to immerse the catalyst bed for a period of from about 2 to about 48 hours or more under quiescent conditions, provided that the treating column embodies the necessary heating means. It is a preferred practice to effect a continuous circulation of the solution through the treating column in contact with the deactivated catalytic composite, the solution being recycled to the column through an external heating means. It should be noted that, in many cases, the catalytic composite is suitably reactivated without further addition of the metal chelate component thereto. However, when it appears that an inordinate amount of a metal chelate component has been leached or otherwise lost from the catalytic composite, reimpregnation is conveniently effected during the reactivation process by including a required quantity thereof in the aqueous ammonium compound solution circulated over the deactivated catalyst. Alternatively, the metal chelate component can be separately reimpregnated in the catalytic composite either prior to or subsequent to the ammonium compound. Reimpregnation of the metal chelate component prior to the ammonium compound has proven to be the better method.

The following example is presented in illustration of certain preferred embodiments of this invention and is not intended as an undue limitation on the generally broad scope of the invention as set out in the appended claims.

EXAMPLE

In this example, a mercaptan oxidation catalyst, deactivated in a commercial treating process, was evaluated with respect to sour petroleum distillate—a kerosine fraction having an end-boiling point of 503° F. and containing 505 ppm. mercaptan sulfur. The deactivated catalyst originally consisted of about 1 wt.% cobalt phthalocyanine monosulfonate adsorbed or impregnated on 10-30 mesh activated charcoal particles. The kerosine was charged down flow through 100 cc. of the deactivated catalyst disposed as a fixed bed in a vertical tubular reactor, the kerosine being charged at a liquid hourly space velocity of about 0.5 under 45 psig. of air—sufficient to provide about 1.5 times the stoichiometric amount of oxygen required to oxidize the mercaptans contained in the kerosine. The catalyst bed was initially wetted with about 10 cc. of an 8% aqueous caustic solution, 10 cc. of said solution being subsequently charged to the catalyst bed at about 12 hour intervals admixed with the kerosine charged thereto. The treated kerosine was analyzed periodically for mercaptan sulfur. After about 300 hours on stream, the treated kerosine continued to analyze about 50 ppm. mercaptan sulfur. At this stage, the deactivated catalyst was washed with 600 cc. of hot (75° C.) water containing 0.25 gms of mixed benzyldimethylalkylammonium hydroxides wherein the alkyl substituent was a straight chain $C_{12}$-$C_{18}$ alkyl substituent. After this reactivation treatment, the kerosine analyzed about 20 ppm. mercaptan sulfur continuing over the subsequent 175 hours on stream. The catalyst was thereafter reimpregnated in situ with about 1 wt.% cobalt phthalocyanine monosulfonate from a methanolic solution thereof and further washed with the described mixed benzyldimethylalkylammonium hydroxides. This reduced the mercaptan sulfur content of the treated kerosine to about 2-3 ppm. over the next 150 hrs. on stream at which point the run was terminated.

I claim as my invention:

1. A method of reactivating a deactivated catalytic composite of an adsorptive carrier material and a metal chelate mercaptan oxidation catalyst which has become deactivated in mercaptan oxidation, which comprises washing the thus deactivated composite with an aqueous quaternary ammonium compound solution at a temperature of from about 55°-175° C.

2. The method of claim 1 further characterized in that said metal chelate mercaptan oxidation catalyst is a metal phthalocyanine.

3. The method of claim 1 further characterized in that said metal chelate mercaptan oxidation catalyst is a cobalt phthalocyanine.

4. The method of claim 1 further characterized in that said metal chelate mercaptan oxidation catalyst is cobalt phthalocyanine monosulfonate.

5. The method of claim 1 further characterized in that said adsorptive carrier material is an activated charcoal.

6. The method of claim 1 further characterized in that said quaternary ammonium compound is represented by the structural formula

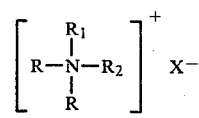

wherein R is a hydrocarbon radical containing up to about 20 carbon atoms and selected from the group consisting of alkyl, cycloalkyl, aryl, alkaryl, and aralkyl, $R_1$ is a substantially straight chain alkyl radical containing from about 5 to about 20 carbon atoms, $R_2$ is selected from the group consisting of aryl, aralkyl and alkaryl, and X is an anion.

7. The method of claim 1 further characterized in that said quaternary ammonium compound is a benzyldimethylalkylammonium hydroxide wherein the alkyl substituent is a substantially straight chain alkyl radical containing from about 5 to about 20 carbon atoms.

8. The method of claim 1 further characterized in that said quaternary ammonium compound is a benzyldimethylalkylammonium hydroxide wherein the alkyl substituent is a substantially straight chain alkyl radical containing from about 12 to about 18 carbon atoms.

9. The method of claim 1 further characterized in that said quaternary ammonium compound is a benzyldimethyldodecylammonium hydroxide.

10. The method of claim 1 further characterized in that said quaternary ammonium compound is benzyldimethyltetradecylammonium hydroxide.

11. The method of claim 1 further characterized in that said quaternary ammonium compound is benzyldimethylhexadecylammonium hydroxide.

12. The method of claim 1 further characterized in that said quaternary ammonium compound is benzyldimethyloctadecylammonium hydroxide.

13. The method of claim 1 further characterized in that the quaternary ammonium compound concentration of said aqueous solution is from about 0.01 to about 10 wt.%.

14. The method of claim 1 further characterized in that said composite is washed with a temperature of from about 90°–110° C.

* * * * *